United States Patent [19]

Perazzolo

[11] Patent Number: 5,924,349
[45] Date of Patent: Jul. 20, 1999

[54] DRIVE DEVICE FOR ROTATING A MACHINE TOOL TABLE

[75] Inventor: Eugenio Perazzolo, Rovigo, Italy

[73] Assignee: Rainer S.r.l., Calderara di Reno, Italy

[21] Appl. No.: 08/821,309

[22] Filed: Mar. 20, 1997

[30] Foreign Application Priority Data

Mar. 20, 1996 [IT] Italy .................................. BO96A0153

[51] Int. Cl.⁶ .............................. B23Q 16/02; B26F 1/04
[52] U.S. Cl. ............................ 83/552; 83/733; 74/813 R; 29/48.5 R
[58] Field of Search .................................. 83/410.7, 733, 83/552, 575; 74/813 R; 29/35.5, 36, 39, 40, 48.5 R; 72/446, 442

[56] References Cited

U.S. PATENT DOCUMENTS

| 4,343,210 | 8/1982 | Kuroyone | 83/552 X |
| 4,558,611 | 12/1985 | Bofelli | 74/826 |
| 5,528,968 | 6/1996 | Chun | 83/552 X |

FOREIGN PATENT DOCUMENTS

| 2233674 | 1/1975 | France . | |
| 2439502 | 5/1980 | France . | |
| 60-048245 | 3/1985 | Japan . | |
| 1-153244 | 6/1989 | Japan . | |
| 2-175030 | 7/1990 | Japan | 83/552 |
| 1482261 | 8/1977 | United Kingdom . | |

*Primary Examiner*—Eugenia A. Jones
*Attorney, Agent, or Firm*—Birch, Stewart, Kolasch & Birch, LLP

[57] ABSTRACT

A drive device, for rotating a machine tool table, includes an armature, of a linear electric motor, located tangentially along the whole lateral surface of a circular table. The armature is connected by its own lateral surface to the table. An inductor, of the linear electric motor, is located substantially facing at least a part of the armature.

9 Claims, 4 Drawing Sheets

DRIVE DEVICE FOR ROTATING A MACHINE TOOL TABLE

BACKGROUND OF THE INVENTION

The present invention relates to a drive device for rotating a machine tool table.

The drive device according to the present invention may be used in combination with a punching machine, which the following description details purely by way of example.

As is known, in all fields of engineering, and particularly on machine tools, drive devices for producing rotation about an axis feature a rotary electric motors. The shaft of the motor may be connected directly, or more often via a mechanical transmission, to the object being driven. For driving tables, in particular, requiring a high torque and low rotation speed, mechanical transmissions with a high reduction ratio (over 10) are normally used.

Using a drive comprising a rotary motor and mechanical transmission, however, presents several drawbacks. In particular, the mechanical transmission, by introducing position errors, impairs the control precision of the motor, and requires high-cost routine maintenance, especially in terms of the downtime involved. Yet a further drawback is the amount of space required for the drive.

SUMMARY OF THE INVENTION

It is an object of the present invention to provide a drive device for rotating a machine tool table, designed to overcome the aforementioned drawbacks.

According to the present invention, there is provided a drive device for rotating a machine tool table comprising an armature, of a linear electric motor, angularly integral with said table. The armature is located along at least a portion of a first circumference centered about the axis of rotation of the table. The drive device is characterized by an inductor, of said linear electric motor, substantially facing the armature along at least a portion of a second circumference centered about the axis of rotation of the table.

BRIEF DESCRIPTION OF THE DRAWINGS

A number of preferred, non-limiting embodiments of the present invention will be described by way of example with reference to the accompanying drawings, in which.

DETAILED DESCRIPTION OF THE INVENTION

Figure 1:
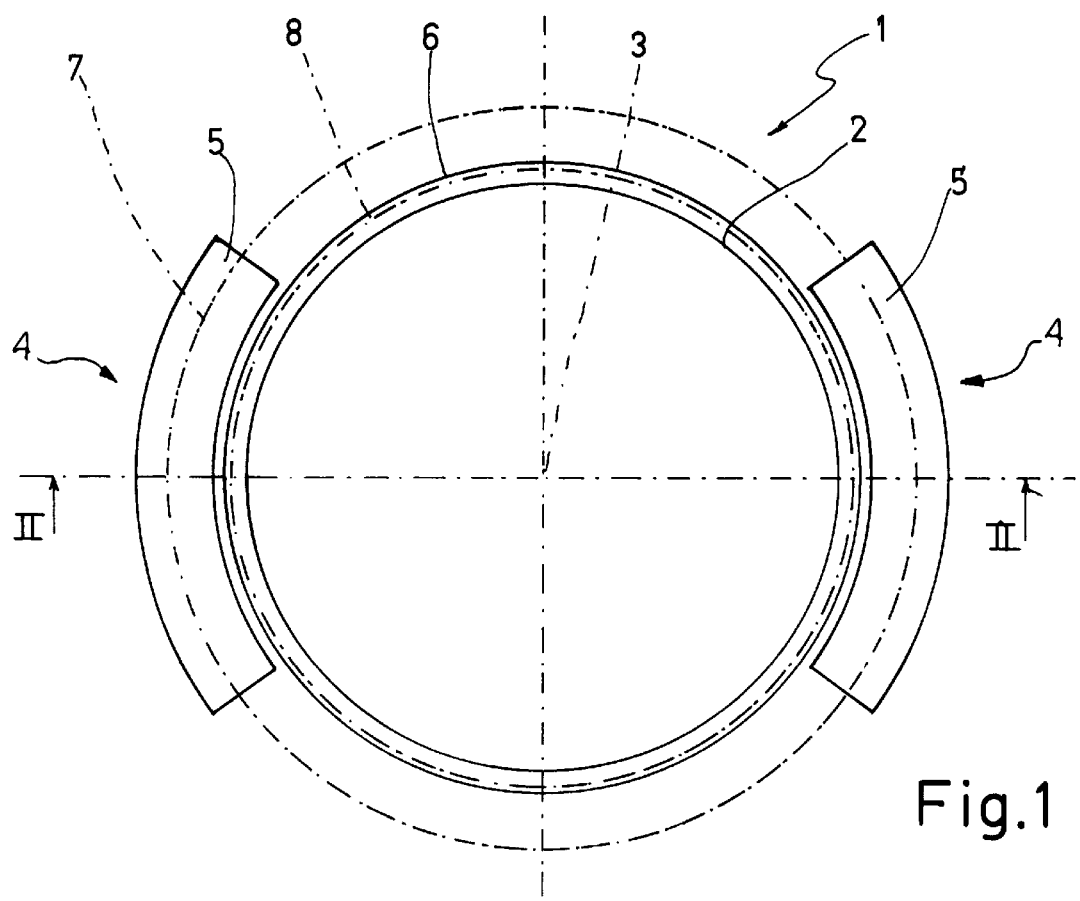
FIG. 1 shows a top plan view of a first preferred embodiment of the device according to the present invention.

Number 1 in FIG. 1 indicates a drive device for rotating a circular horizontal table 2 about a vertical axis 3. Drive device 1 comprises a linear electric motor 4, in turn comprising an inductor or primary 5 and an armature or secondary 6; armature 6 is angularly integral with table 2 and located along at least a portion of a first circumference 8 centered about axis 3; and inductor 5 is located facing armature 6 along at least a portion of a second circumference 7 centered about axis 3.

Inductor 5 may face armature 6 internally or externally, i.e. the diameter of second circumference 7 may be respectively smaller or greater than first circumference 8.

Figure 3:
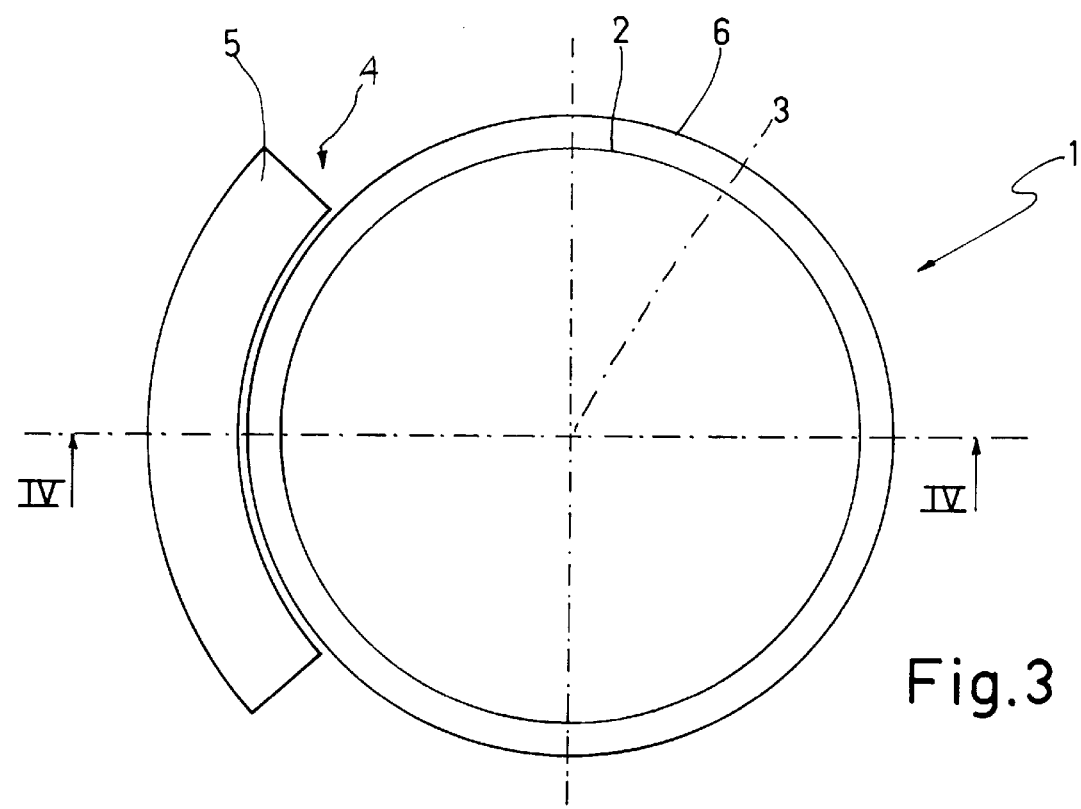
FIG. 3 shows a top plan view of a second preferred embodiment of the device according to the present invention.
Figure 2:
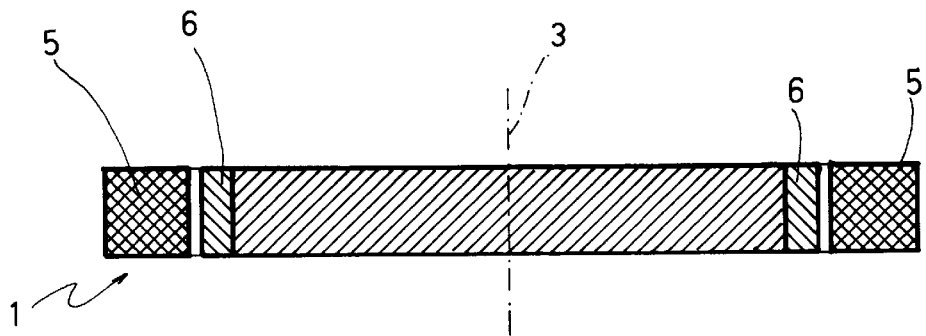
FIG. 2 shows a section along line II—II in FIG. 1.
Figure 4:
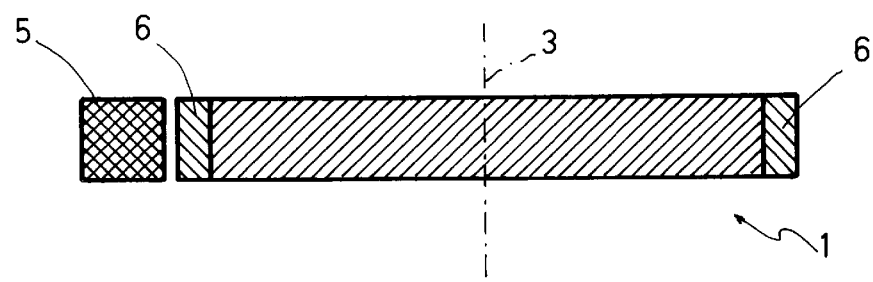
FIG. 4 shows a section along line IV—IV in FIG. 3.
Figure 7:
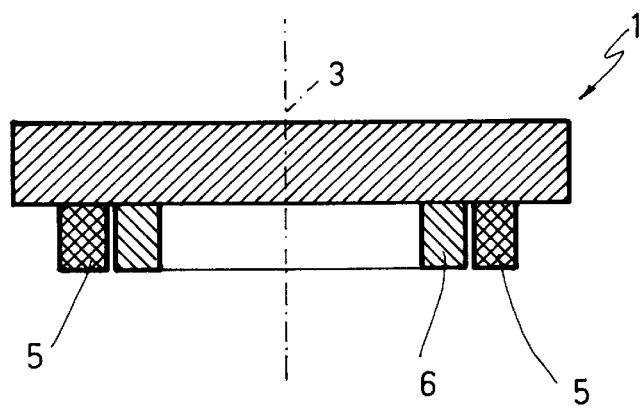
FIG. 7 shows a section along line VII—VII in FIG. 5.
Figure 5:
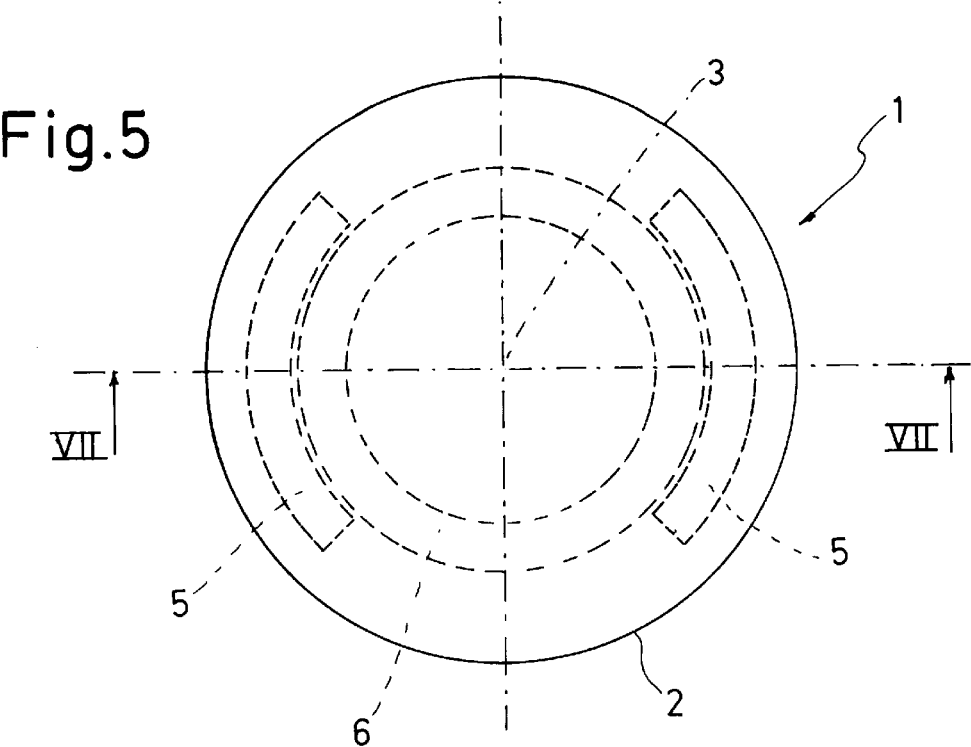
FIG. 5 shows a top plan view of a third preferred embodiment of the device according to the present invention.
Figure 6:
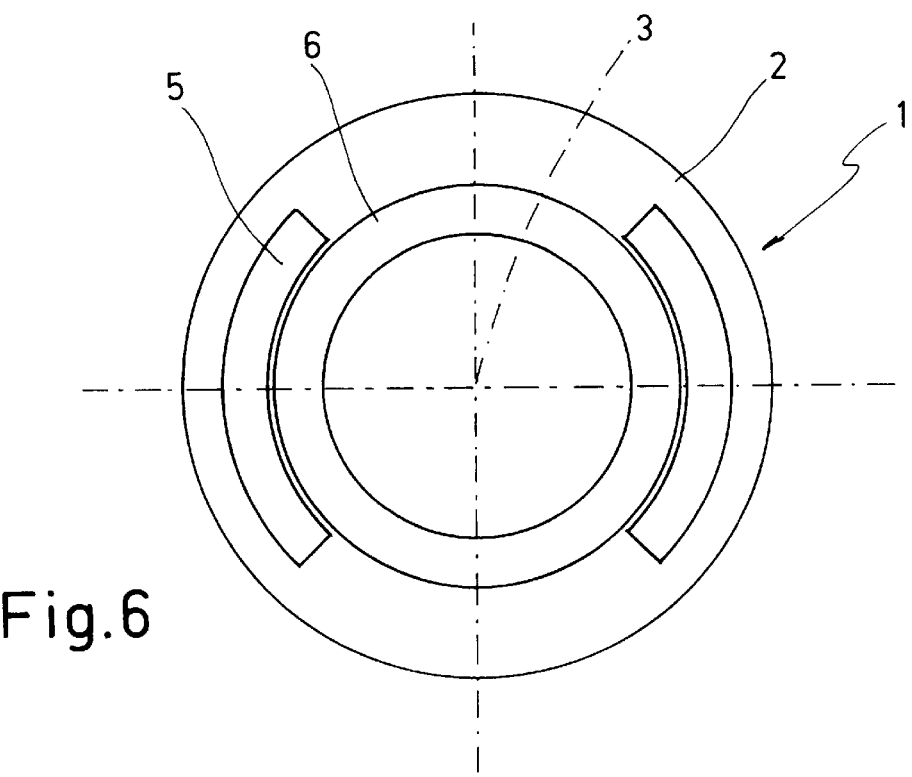
FIG. 6 shows a bottom plan view of the FIG. 5 device.
Figure 9:
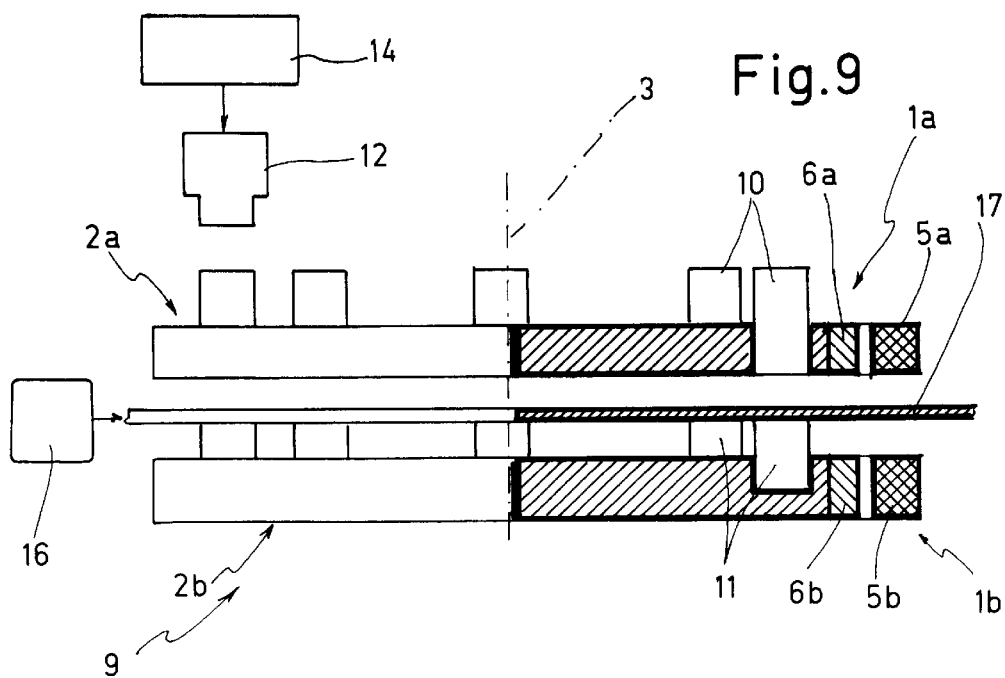
FIG. 9 shows a section along line IX—IX in FIG. 8.

As shown in FIGS. 1 and 3, table 2 may have a cylindrical outer periphery surrounded by armature 6, and to which the inner lateral surface of the armature is connected; or, as shown in FIGS. 5 and 6, armature 6 may be connected by its upper surface to the bottom of table 2; or (not shown), armature 6 may be connected by its bottom surface to the top of table 2.

The angles covered by inductor 5 and armature 6 depend on different requirements. The angle covered by inductor 5 depends on the drive torque required—the greater the drive torque, the greater the angle covered by inductor 5—but must be substantially no greater than the angle covered by armature 6, in that any portion of inductor 5 not facing a corresponding portion of armature 6 produces substantially no drive torque. The angle covered by armature 6, on the other hand, depends on the amount of rotation required, in that, to avoid a drastic reduction in drive torque, inductor 5 must face a corresponding portion of armature 6 throughout the movement of table 2. That is, for table 2 to make a complete turn, armature 6 must cover an angle of 360°.

Linear electric motor 4 may be of various known types, e.g. a synchronous, asynchronous, direct-current or step motor. For machine tools, synchronous or asynchronous linear electric motors are more advantageous. In the case of drives not requiring a particularly high drive torque, use is conveniently made of asynchronous motors in which armature 6 is defined by a portion of the table itself. That is, as opposed to being formed separately and fixed to table 2, armature 6 is formed directly on table 2, thus obviously saving on material. In this case, a squirrel cage may be formed on table 2, or, in the case of low drive torques, table 2 may simply be used as it is with no special alterations. This type of armature 6 may, of course, only be formed if table 2 is made of steel or other material with good magnetic characteristics.

Figure 8:
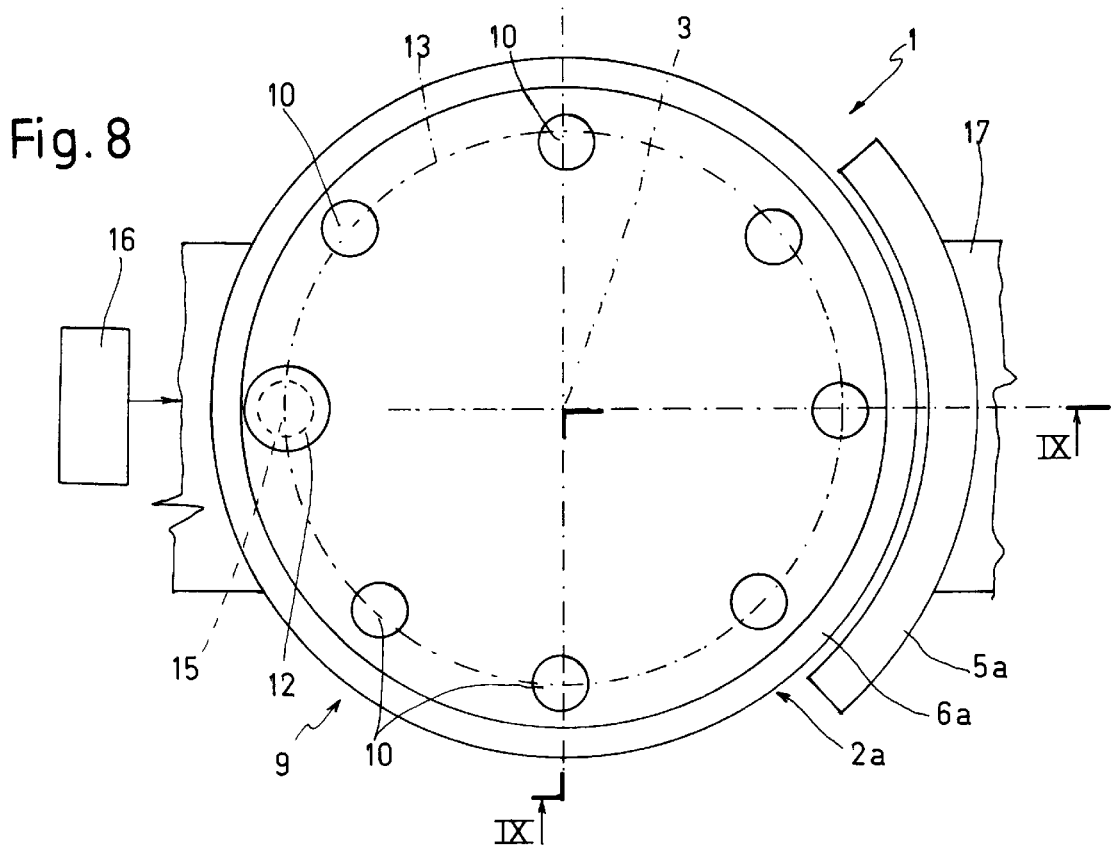
FIG. 8 shows a top plan view of a machine tool featuring the device according to the present invention.

FIG. 8 shows an example of drive device 1 according to the present invention, as applied to a punching machine 9 comprising two circular horizontal tables—a top table 2a and bottom table 2b—rotating about a vertical axis 3. Top table 2a supports a number of punches 10 arranged along a punch circumference 13 centered about axis 3, and bottom table 2b supports a number of dies 11 corresponding to and arranged similarly to punches 10. Machine 9 also comprises a hammer 12 moved up and down by actuating means 14. The hammer 12 operates the punches 10 at a predetermined work station 15. Actuating means 16 feeds a metal work sheet 17 horizontally into the machine 9. Top and bottom tables 2a and 2b are rotated respectively by top and bottom drive devices 1a and 1b. The top drive device 1a comprises an inductor 5a, and an armature 6a connected tangentially by its lateral surface to the whole circumference of the top table 2a. The bottom drive device 1b comprises an inductor 5b and an armature 6b connected tangentially by its lateral surface to the whole circumference of the bottom table 2b.

Operation of drive device 1 is quite straightforward. When electricity is supplied, inductor 5 of the linear electric motor 4 generates on the armature 6, a force directed tangentially with respect to the armature. Since the armature 6 is angularly integral with the table 2 and located along a portion of the first circumference 8, centered about the axis of rotation 3 of the table 2, said force results in a drive torque for rotating the table 2.

The device according to the present invention affords numerous advantages by featuring no mechanical transmission of any sort. The driving force generated by the motor, i.e. the armature movement, is connected directly to the table being driven. Control of the motor is extremely precise by eliminating any position errors introduced by transmission components. No maintenance is required, by virtue of the drive involving no mechanical contact. And, finally, the drive, according to the present invention, is considerably more compact as compared with traditional types.

Clearly, changes may be made to device 1, as described and illustrated herein, without departing from the scope of the present invention.

What is claimed is:

1. A punching machine comprising:

a first table mounted for rotation about a first axis;

a plurality of punches supported by said first table;

a second table mounted for rotation about a second axis, at least one portion of said second table overlapping said first table;

a plurality of dies, each of which is sized to co-act with at least one of said plurality of punches, each of said plurality of dies being supported by said second table;

a first linear motor for indexing said first table by rotating said first table about said first axis and by stopping said first table at a desired location, said first linear motor including:

a first armature connected to said first table, said first armature having a first cylindrical periphery centered about said first axis; and a first inductor, said first inductor extending alongside and facing said first armature, said first inductor including first and second portions, said first and second portions being equal in size, arranged symmetrically about said first axis, and each of said first and second portions extending for up to ninety degrees about said first axis;

a second linear motor for indexing said second table by rotating said second table about said second axis and by stopping said second table at a desired location, said second linear motor including:

a second armature connected to said second table, said second armature having a second cylindrical periphery centered about said second axis; and a second inductor, said second inductor extending alongside and facing said second armature, said second inductor including third and fourth portions, said third and fourth portions being equal in size, arranged symmetrically about said second axis, and each of said third and fourth portions extending for up to ninety degrees about said second axis; and a work station arranged adjacent to said overlapping portion of said first and second tables, said work station including a hammer for operating said plurality of punches.

2. The punching machine according to claim 1, wherein each of said first and second portions extends for approximately ninety degrees about said first axis, and each of said third and fourth portions extends for approximately ninety degrees about said second axis.

3. The punching machine according to claim 1, wherein said first axis is vertical and collinear with said second axis.

4. The punching machine according to claim 1, wherein said first table has a first cylindrical outer periphery, said second table has a second cylindrical outer periphery, said first armature is attached to said first cylindrical outer periphery, and said second armature is attached to said second cylindrical outer periphery.

5. The punching machine according to claim 1, wherein said first and second linear motors are synchronous linear electric motors.

6. The punching machine according to claim 1, wherein said first and second linear motors are asynchronous linear electric motors.

7. The punching machine according to claim 1, wherein said first armature is attached to an undersurface of said first table and said second armature is attached to an undersurface of said second table.

8. The punching machine according to claim 1, wherein said first cylindrical periphery of said first armature is an outer first cylindrical periphery, said first inductor faces said outer first cylindrical periphery, said second cylindrical periphery of said second armature is an outer second cylindrical periphery, and said second inductor faces said outer second cylindrical periphery.

9. The punching machine according to claim 1, wherein said plurality of punches are uniformly distributed along a first circumference relative to said first axis of said first table, and said plurality of dies are uniformly distributed along a second circumference relative to said second axis of said second table.

* * * * *